(12) United States Patent
Guindy et al.

(10) Patent No.: US 6,541,155 B2
(45) Date of Patent: Apr. 1, 2003

(54) BICELL BATTERY APPARATUS

(75) Inventors: Wade W. Guindy, Henderson, NV (US); David Irwin, Co Antrim (GB)

(73) Assignee: Valence Technology, Inc., Henderson, NV (US)

( * ) Notice: Subject to any disclaimer, the term of this patent is extended or adjusted under 35 U.S.C. 154(b) by 215 days.

(21) Appl. No.: 09/745,850

(22) Filed: Dec. 21, 2000

(65) Prior Publication Data

US 2002/0081488 A1 Jun. 27, 2002

(51) Int. Cl.[7] .................. H01M 10/40; H01M 2/14; H01M 4/64
(52) U.S. Cl. .................. 429/162; 429/127; 429/144; 429/233; 429/246
(58) Field of Search ................ 429/162, 127, 429/233, 245, 144, 246

(56) References Cited

U.S. PATENT DOCUMENTS

| | | | |
|---|---|---|---|
| 4,997,732 A | | 3/1991 | Austin et al. |
| 5,326,652 A | | 7/1994 | Lake |
| 5,405,715 A | | 4/1995 | Dawson |
| 5,445,856 A | | 8/1995 | Chaloner-Gill |
| 5,460,904 A | | 10/1995 | Gozdz |
| 5,534,368 A | * | 7/1996 | Morris et al. .............. 429/152 |
| 5,585,206 A | | 12/1996 | Morris |
| 5,587,253 A | | 12/1996 | Gozdz et al. |
| 5,670,272 A | | 9/1997 | Cheu et al. |
| 5,741,608 A | * | 4/1998 | Kojima et al. .......... 429/144 X |
| 6,042,966 A | | 3/2000 | Cheu |
| 6,063,519 A | | 5/2000 | Barker et al. |
| 6,436,155 B1 | * | 8/2002 | Gross .................... 429/153 X |
| 2002/0081488 A1 | * | 6/2002 | Guindy et al. ......... 429/144 X |

* cited by examiner

*Primary Examiner*—John S. Maples
(74) *Attorney, Agent, or Firm*—Roger A. Williams; Michael D. Ross; Cynthia Kovecevic

(57) ABSTRACT

In one implementation, a bicell battery apparatus includes first and second counter electrodes and an intermediate electrode positioned therebetween. Respective end edges of the first and second counter electrodes are received outwardly beyond a respective end edge of the intermediate electrode at a region. A current collector extension extends from one of the end edges of the intermediate electrode within the region and extends outwardly beyond the respective end edges of the first and second counter electrodes within the region. A first substantially electrolyte impermeable insulative layer is received between the current collector extension and the first counter electrode. A second substantially electrolyte impermeable insulative layer is received between the current collector extension and the second counter electrode.

21 Claims, 4 Drawing Sheets

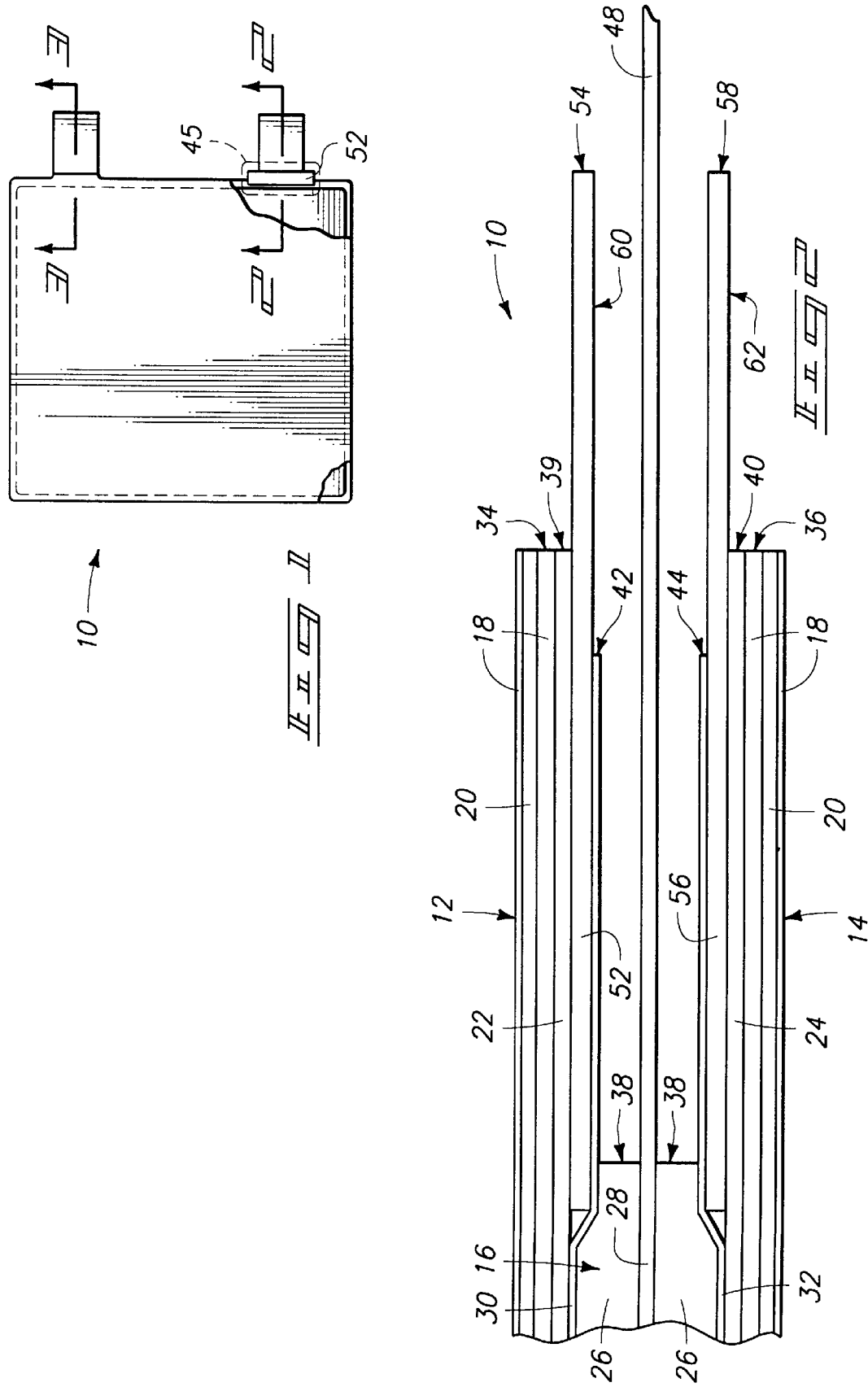

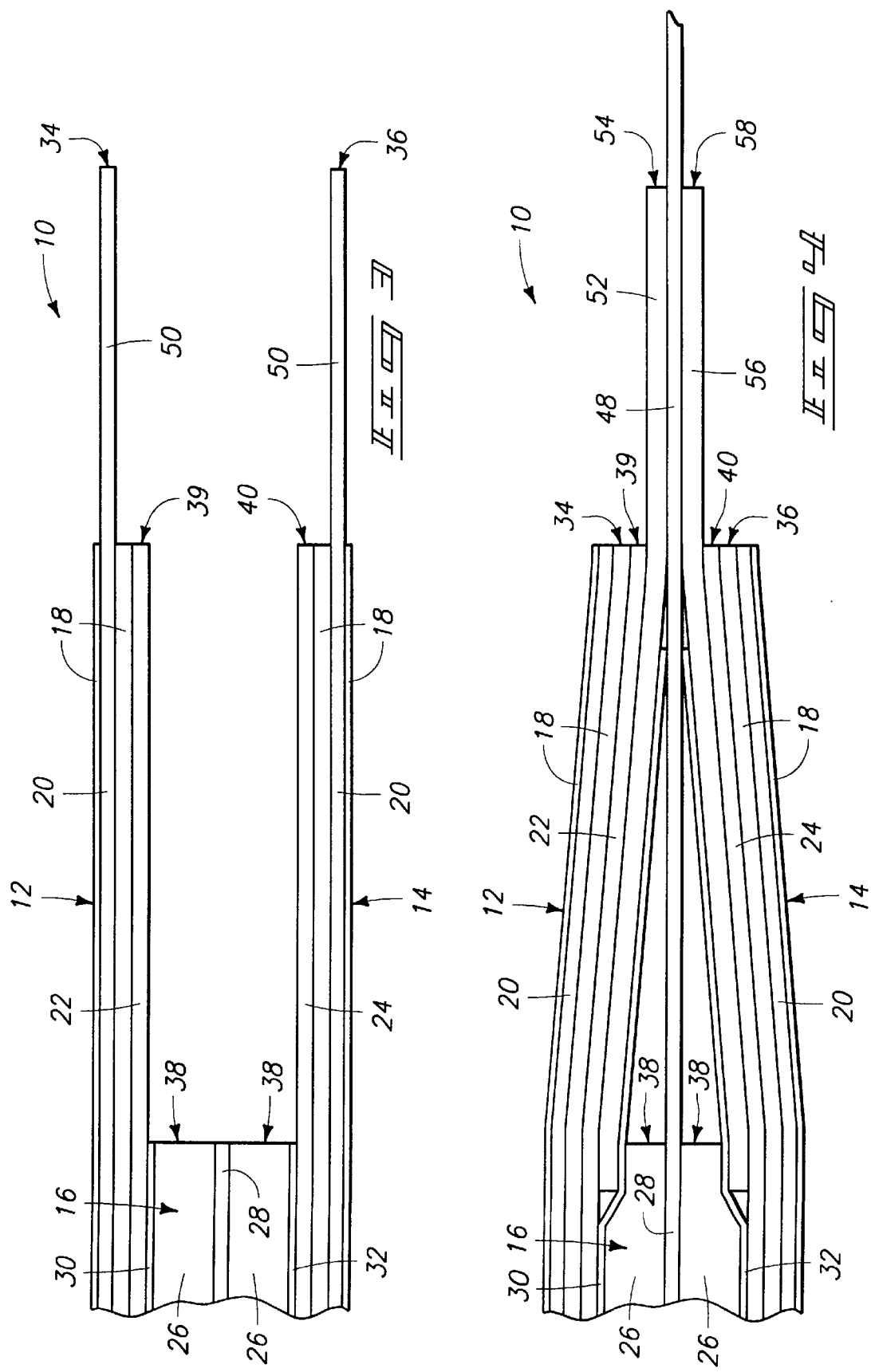

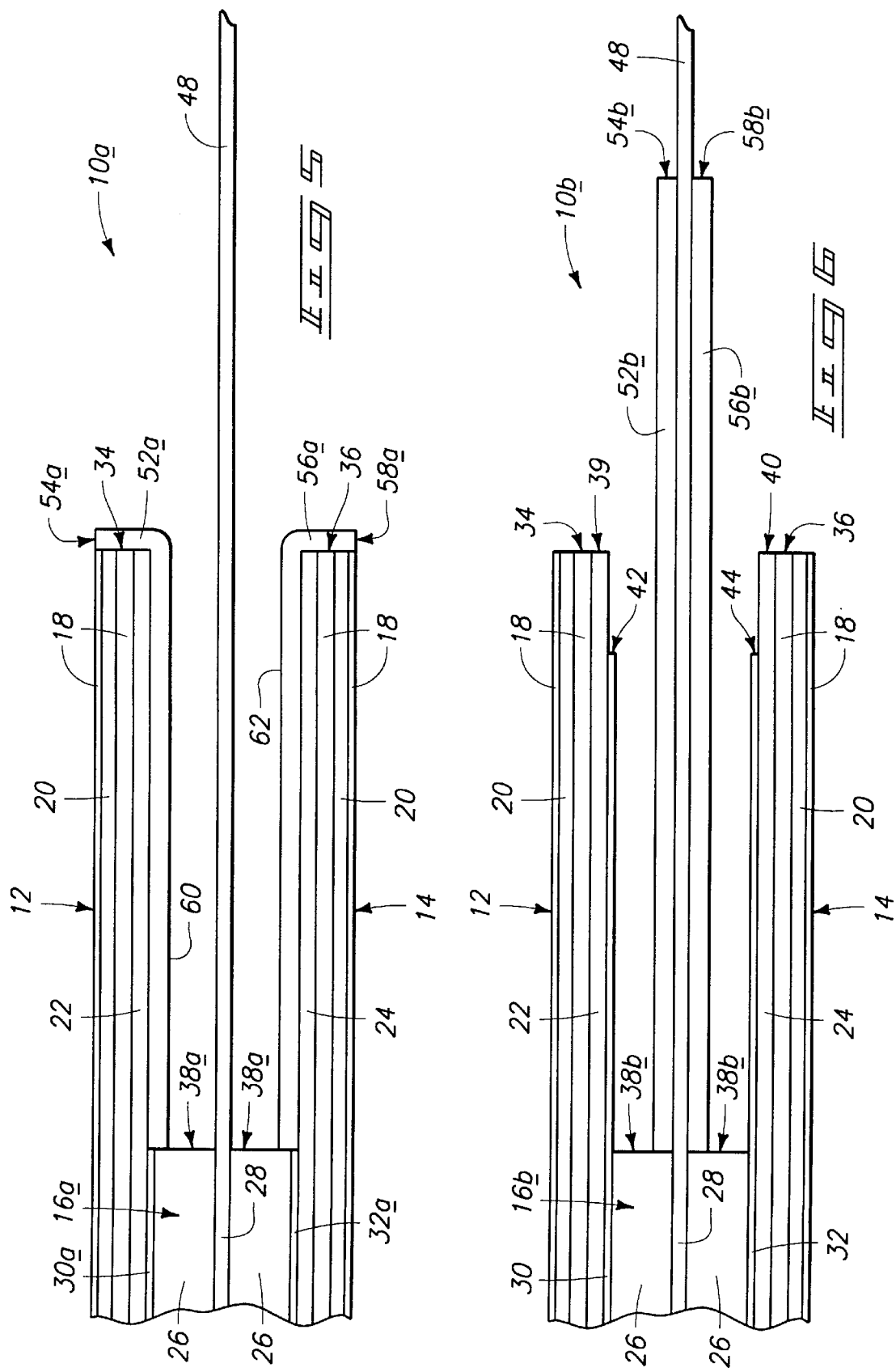

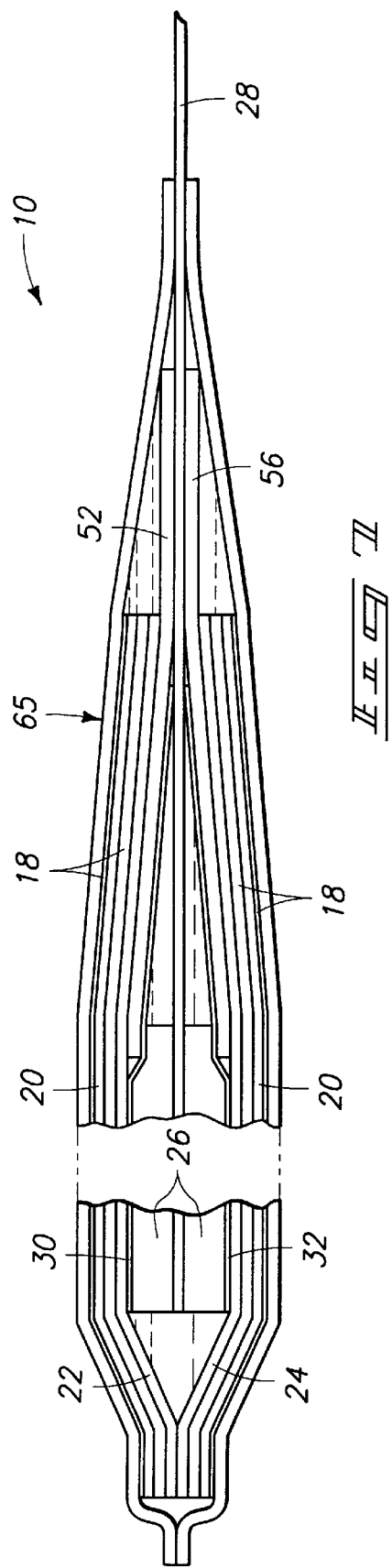

BICELL BATTERY APPARATUS

TECHNICAL FIELD

This invention relates to bicell batteries.

BACKGROUND ART

This disclosure of the invention is submitted in furtherance of the constitutional purposes of the U.S. Patent Laws "to promote the progress of science and useful arts" (Article 1, Section 8).

Batteries based on aqueous, non-aqueous and solid electrolytes are manufactured as power sources for microelectronic and portable electronic equipment. Size and weight are typically significant considerations in a design. Some designs include a plurality of thin layers which are laminated together. Some batteries include several electrolytic cells in which the current from each of the cells is accumulated in parallel by respective anode and cathode current collectors. In certain designs, the current collectors are gathered and welded to respective terminal strips. The battery components can be sealed or enveloped in a heat-sealable laminate which serves as the protective housing for the battery, with the welded terminal strips projecting therefrom for electrically engaging the battery.

One type of battery construction is a bicell. An individual bicell has two counter electrodes positioned on either side of an intermediate electrode. Pluralities of bicells can be combined in series or parallel in a single battery. Individual bicells typically include current collectors embedded in the respective electrode active materials. The individual current collectors typically have extensions or projections which extend outwardly from the electrode active material. The counter electrode extensions typically are designed to overlap, and are electrically connected together. The middle or intermediate current collector extension is typically on the same side of the construction as the counter electrode extensions but remotely located therefrom. If the battery comprises multiple bicells connected in parallel, for example, the respective positive and negative current collector extensions are typically gathered and welded together with a terminal tab. An insulative housing typically envelops the various components with one positive terminal tab and one negative terminal tab projecting therefrom.

The intermediate electrode and the outer counter electrodes are typically operatively spaced from one another by at least one electrolyte bearing separator. In one design, the outer counter electrodes include end edges which extend outwardly beyond end edges of the intermediate electrode. To keep the counter electrodes from contacting and shorting to the end edges of the intermediate electrode, the separators are typically configured to extend suitably beyond the end edges of at least the intermediate electrode, and typically beyond the end edges of the counter electrodes as well. In some situations, there can be a tendency to pull the intermediate electrode current collector extensions toward the counter electrode when such are subjected to vacuum during manufacture. This could result in cell shorting.

While the invention was principally motivated in addressing the above issue, it is in no way so limited. The artisan will appreciate applicability of the invention to other aspects of existing or yet-to-be-developed bicell constructions or apparatus, with the invention only being limited by the accompanying claims as literally worded and as appropriately interpreted in accordance with the doctrine of equivalents.

BRIEF DESCRIPTION OF THE DRAWINGS

Preferred embodiments of the invention are described below with reference to the following accompanying drawings.

FIG. 1 is a diagrammatic top plan view of a bicell battery apparatus.

FIG. 2 is an enlarged diagrammatic sectional view as would be taken through line 2—2 of FIG. 1.

FIG. 3 is an enlarged diagrammatic sectional view as would be taken through line 3—3 of FIG. 1.

FIG. 4 is a diagrammatic sectional view taken through line 2—2 of FIG. 1 of the battery apparatus in subsequent partial assembly.

FIG. 5 is an alternate embodiment view to the FIG. 2 view.

FIG. 6 is another alternate embodiment view to the FIG. 2 view.

FIG. 7 is a diagrammatic view of a completed bicell battery apparatus in accordance with an aspect of the invention.

BEST MODES FOR CARRYING OUT THE INVENTION AND DISCLOSURE OF INVENTION

The invention comprises bicell battery apparatus. In one implementation, a bicell battery apparatus includes first and second counter electrodes and an intermediate electrode positioned therebetween. Respective end edges of the first and second counter electrodes are received outwardly beyond a respective end edge of the intermediate electrode at a region. A current collector extension extends from one of the end edges of the intermediate electrode within the region and extends outwardly beyond the respective end edges of the first and second counter electrodes within the region. A first substantially electrolyte impermeable insulative layer is received between the current collector extension and the first counter electrode. A second substantially electrolyte impermeable insulative layer is received between the current collector extension and the second counter electrode.

In one implementation, a bicell battery apparatus includes first and second counter electrodes and an intermediate electrode positioned therebetween. A first separator is received between the first counter electrode and the intermediate electrode and a second separator is received between the second counter electrode and the intermediate electrode. A substantially electrolyte impermeable insulative layer is received between only a portion of a) one of the first and second separators, and b) one of the first counter electrode, the second counter electrode and the intermediate electrode. The insulative layer extends outwardly beyond one of the respective end edges of the one of the first and second separators and outwardly beyond one of the respective end edges of the one of the first counter electrode, the second counter electrode and the intermediate electrode.

Other implementations are contemplated.

Referring initially to FIGS. 1–3, an exemplary bicell battery apparatus in accordance with but one implementation of the invention is indicated generally with reference numeral 10. Such comprises an individual bicell having a first counter electrode 12, a second counter electrode 14, and an intermediate electrode 16 positioned therebetween. The preferred implementation is an anode-out assembly wherein counter electrodes 12 and 14 comprise anodes and intermediate electrode 16 comprises a cathode. The preferred anode of each counter electrode 12 and 14 comprises anode active material 18 (i.e., preferably a polymeric binder in a carbonaceous particulate material) which houses respective anode current collectors 20. An example and preferred material for the anode current collector is a copper mesh material. First and second counter electrodes 12 and 14 include separators 22 and 24, respectively, which face intermediate electrode 16.

The preferred intermediate cathode electrode 16 comprises a cathode active material 26 (i.e., preferably a lithium metal oxide) which sandwiches a cathode current collector 28. An example and preferred material for the cathode current collector is an aluminum mesh material. Intermediate electrode 16 has outwardly opposing separators 30 and 32 which face first and second counter electrode separators 22 and 24, respectively. Accordingly in the illustrated and preferred embodiment, two separators are received between each counter electrode 12, 14 and intermediate electrode 16. A single separator received between each electrode is also, of course, contemplated.

First and second counter electrodes 12 and 14 include respective end edges 34 and 36. Intermediate electrode 16 includes an end edge 38. First and second counter electrode separators 22 and 24 include end edges 39 and 40, respectively. In the illustrated and preferred embodiment, end edges 39, 40 are substantially coincident with the respective counter electrode end edges 34 and 36. Opposing intermediate electrode separators 30 and 32 include end edges 42 and 44, respectively. End edges 34, 36, 38, 39, 40 can be considered as being received within a region 45 (FIG. 1). First and second counter electrode end edges 34 and 36 are received outwardly beyond end edge 38 of intermediate electrode 16 within region 45. Further, intermediate electrode separators 30 and 32 end edges 42 and 44 are received outwardly of intermediate electrode edge 38 within region 45.

Current collector 28 includes an extension 48 extending from intermediate electrode end edge 38 within region 45, and which extends outwardly beyond end edges 34 and 36 of first and second counter electrodes 12 and 14 within region 45. Counter electrode current collectors 20 include current collector extensions 50 (FIG. 3).

A first substantially electrolyte impermeable insulative layer 52 is received between first counter electrode separator 22 and intermediate electrode separator 30, and received between first counter electrode 12 and current collector extension 48. First insulative layer 52 includes an end edge 54 which is received outwardly beyond end edge 34 of first counter electrode 12 within region 45. A second substantially electrolyte impermeable insulative layer 56 is received between second counter electrode separator 24 and intermediate electrode separator 32, and received between second counter electrode 14 and current collector extension 48. Second insulative layer 56 has an end edge 58 which is received outwardly beyond end edge 40 of second counter electrode 14 within region 45. Preferably as shown, first insulative layer 52 contacts separators 22 and 30, and second insulative layer 56 contacts separators 32 and 24.

Preferred exemplary materials for insulating layers 52 and 56 include ethylene acrylic acid, polyester and any other material or materials which exhibit compatibility with the other battery components and electrolytes. One example preferred material is polyester adhesively backed tape. Such tape might be double-sided adhesively coated or have adhesive only coated on one respective side thereof. In one preferred embodiment, only single adhesive sided tape is utilized with the respective adhesive sides of each insulative layer facing in a common direction, for example being positioned on illustrated sides 60 and 62 and facing downwardly (FIG. 2). An exemplary preferred thickness range for insulative layers 52 and 56 is from about 0.001 inch to about 0.02 inch, with 0.005 inch being an exemplary preferred specific example. The illustrated FIG. 2 construction is diagrammatically shown and typically assembled by laminating the various layers together in multiple lamination steps.

By way of example only, one alternate embodiment is shown in FIG. 5. Like numerals from the first described embodiment are utilized where appropriate, with differences being indicated with the suffix "a". FIG. 5 illustrates a bicell apparatus 10a having insulative layers 52a and 56a which wrap over counter electrode end edges 34 and 36, respectively. Such might be formed by a separate lamination application, or more preferably by painting, spraying or other application coating over the illustrated surfaces.

Further by way of example only, FIG. 6 illustrates an alternate provision of insulative layers at the various respective claimed positionings to those depicted by FIGS. 2 and 5. Like numerals from the first described embodiment are utilized where appropriate, with differences being indicated by the suffix "b". FIG. 6 depicts a bicell apparatus 10b having insulative layers 52b and 56b having been applied or otherwise formed relative to current collector extension 48, and preferably to extend beyond first counter electrode end edge 34 and second counter electrode end edge 36. In this illustrated example, insulative layers 52 and 56 contact current collector extension 48.

Alternate embodiments from those depicted are, of course, contemplated, with the invention only being limited by the accompanying claims appropriately interpreted in accordance with the doctrine of equivalents. For example and by way of example only, only a single insulative layer might be provided between one counter electrode and the intermediate electrode, and no insulative layer being provided between the other counter electrode and the intermediate electrode. Further, more than the illustrated single layer might be provided on one or both sides of the illustrated current collector extensions. Further, the invention contemplates fabrication of individual bicells in addition to the single bicell apparatus construction shown. Further, the various end edge positionings of the various components might be varied without limitation in any manner not otherwise literally limited by the accompanying claims without reference to the drawings or specification.

FIGS. 4 and 7 illustrate typical bunching or compression of the various components in the first described embodiment at the ends of the apparatus upon assembly, and a diagrammatic enveloping housing 65 formed over the various components. A suitable electrolyte is also provided therein. Preferably as shown, such brings the respective insulative layers into contact with the current collector extension.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A bicell battery apparatus, comprising:
an intermediate electrode positioned between a first counter electrode and a second counter electrode, the first and second counter electrodes each having an end edge extending outwardly beyond a corresponding end edge of the intermediate electrode;
a single-layer first separator positioned between the first counter electrode and the intermediate electrode;
a single-layer second separator positioned between the second counter electrode and the intermediate electrode;
a current collector extension extending from the end edge of the intermediate electrode, and further extending outwardly beyond the end edges of the first and second counter electrodes; and
a substantially electrolyte impermeable insulative layer positioned between the current collector extension and the first counter electrode.

2. The battery apparatus of claim 1, wherein the fist separator is further positioned between the insulative layer and the first counter electrode.

3. The battery apparatus of claim 1, wherein the insulative layer has an end edge extending outwardly beyond the end edge of the first counter electrode.

4. The battery apparatus of claim 1, wherein the insulative layer comprises a thickness of from about 0.001 inches to about 0.02 inches.

5. The battery apparatus of claim 1, wherein the insulative layer comprises adhesively backed tape.

6. The battery apparatus of claim 1, wherein the insulative layer comprises adhesively backed tape having adhesive on only one side.

7. The battery apparatus of claim 1, wherein the insulative layer wraps over the end edge of the first counter electrode.

8. A bicell battery apparatus, comprising:
an intermediate electrode positioned between a first counter electrode and a second counter electrode, the first and second counter electrodes each having an end edge extending outwardly beyond a corresponding end edge of the intermediate electrode;
a single-layer first separator positioned between the first counter electrode and the intermediate electrode, and a single-layer second separator positioned between the second counter electrode and the intermediate electrode,
a current collector extension extending from the end edge of the intermediate electrode, and further extending outwardly beyond the end edges of the first and second counter electrodes;
a substantially electrolyte impermeable first insulative layer positioned between the current collector extension and the first counter electrode; and
a substantially electrolyte impermeable second insulative layer positioned between the current collector extension and the second counter electrode.

9. The battery apparatus of claim 8, wherein the first separator is further positioned between the first insulative layer and the first counter electrode; and the second separator is further positioned between the secondary insulative layer and the second counter electrode.

10. The battery apparatus of claim 8, wherein the first insulative layer has an end edge extending outwardly beyond the end edge of the first counter electrode, and the second insulative layer has an end edge extending outwardly beyond the end edge of the second counter electrode.

11. The battery apparatus of claim 8, wherein the first and second insulative layers each comprise a thickness of from about 0.001 inches to about 0.02 inches.

12. The battery apparatus of claim 8, wherein the first and second insulative layers each comprise adhesively backed tape.

13. The battery apparatus of clam 8, wherein the first and second insulative layers each comprise adhesively backed tape having adhesive on only one side.

14. The battery apparatus of claim 8, wherein the first and second insulative layers comprise adhesively backed tape having adhesive on only one side, the side of each tape facing in a common direction.

15. The battery apparatus of claim 8, wherein the first insulative layer wraps over the corresponding end edge of the first counter electrode, and the second insulative layer wraps over the corresponding end edge of the second counter electrode.

16. A bicell battery apparatus, comprising:
an intermediate electrode positioned between a first counter electrode and a second counter electrode, the first and second counter electrodes each having an end edge extending outwardly beyond a corresponding end edge of the intermediate electrode;
a current collector extension extending from the end edge of the intermediate electrode, and further extending outwardly beyond the end edges of the first and second counter electrodes;
a substantially electrolyte impermeable first insulative layer positioned between the first counter electrode and the intermediate electrode;
a substantially electrolyte impermeable second insulative layer positioned between the second counter electrode and the intermediate electrode;
a single-layer first separator positioned between the first counter electrode and the intermediate electrode, and farther positioned between the first counter electrode and the first insulative layer; and
a single-layer second separator positioned between the second counter electrode and the intermediate electrode, and further positioned between the second counter electrode and the second insulative layer.

17. The battery apparatus of claim 16, wherein the first and second insulative layers each comprise a thickness of from about 0.001 inches to about 0.02 inches.

18. The battery apparatus of claim 16, wherein the first and second insulative layers each comprise adhesively backed tape.

19. The battery apparatus of claim 16, wherein the first and second insulative layers each comprise adhesively backed tape having adhesive on only one side.

20. The battery apparatus of claim 16, wherein the first and second insulative layers comprise adhesively backed tape having adhesive on only one side, the side of each tape facing in a common direction.

21. The battery apparatus of claim 16, wherein the first insulative layer wraps over the corresponding end edge of the first counter electrode, and the second insulative layer wraps over the corresponding end edge of the second counter electrode.

* * * * *